(12) United States Patent
Abe et al.

(10) Patent No.: US 7,297,442 B2
(45) Date of Patent: Nov. 20, 2007

(54) NONAQUEOUS ELECTROLYTIC SOLUTION AND LITHIUM SECONDARY BATTERY EMPLOYING THE SAME

(75) Inventors: Koji Abe, Yamaguchi (JP); Takaaki Kuwata, Yamaguchi (JP); Takashi Hattori, Yamaguchi (JP); Yasuo Matsumori, Yamaguchi (JP)

(73) Assignee: Ube Industries, Ltd. (JP)

( * ) Notice: Subject to any disclaimer, the term of this patent is extended or adjusted under 35 U.S.C. 154(b) by 494 days.

(21) Appl. No.: 10/507,110

(22) PCT Filed: Mar. 13, 2003

(86) PCT No.: PCT/JP03/02991

§ 371 (c)(1),
(2), (4) Date: Sep. 10, 2004

(87) PCT Pub. No.: WO03/077351

PCT Pub. Date: Sep. 18, 2003

(65) Prior Publication Data

US 2005/0255384 A1    Nov. 17, 2005

(30) Foreign Application Priority Data

Mar. 13, 2002 (JP) ............................. 2002-068034

(51) Int. Cl.
*H01M 6/04* (2006.01)
(52) U.S. Cl. ............... 429/199; 429/200; 429/327; 429/326; 429/324; 429/330; 429/336; 429/332; 429/231.1; 429/231.3; 429/231.4; 429/231.8; 252/62.2

(58) Field of Classification Search ............... 429/199, 429/200, 327, 326, 324, 330, 336, 332, 231.1, 429/231.3, 231.4, 231.8; 252/62.2
See application file for complete search history.

(56) References Cited

FOREIGN PATENT DOCUMENTS

| JP | 9-50822 | * | 2/1997 |
|---|---|---|---|
| JP | 09-050822 A | | 2/1997 |
| JP | 11-329490 | * | 11/1999 |
| JP | 11-329490 A | | 11/1999 |
| JP | 11-329496 A | | 11/1999 |
| JP | 2000-156243 A | | 6/2000 |
| JP | 2000-323169 A | | 11/2000 |

* cited by examiner

*Primary Examiner*—Laura Weiner
(74) *Attorney, Agent, or Firm*—Nixon Peabody LLP; Jeffrey L. Costellia

(57) ABSTRACT

1. A non-aqueous electrolytic solution comprising an electrolytic salt in a non-aqueous solvent, which further contains a pentafluorophenoxy compound having the formula (I):

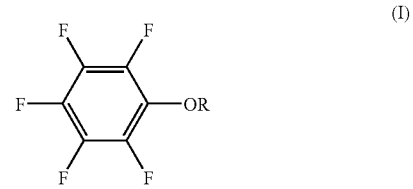

in which R represents a substituting group such as an alkylcarbonyl group, an alkoxycarbonyl group, an aryloxycarbonyl group, and an alkanesulfonyl group, under the condition that at least one hydrogen atom contained in the substituting group can be substituted with a halogen atom or an aryl group.

17 Claims, No Drawings

NONAQUEOUS ELECTROLYTIC SOLUTION AND LITHIUM SECONDARY BATTERY EMPLOYING THE SAME

FIELD OF INVENTION

The present invention relates to a non-aqueous electrolytic solution which imparts to lithium secondary batteries favorable battery performances in the electric capacity and the storage property and further in the battery cycle property, and further relates to a lithium secondary battery containing the same.

BACKGROUND OF INVENTION

At present, a lithium secondary battery is generally employed as an electric source for driving small electronic devices. The lithium secondary battery essentially comprises a positive electrode, a non-aqueous electrolytic solution, and a negative electrode. A lithium secondary battery utilizing a positive electrode of lithium compound oxide such as $LiCoO_2$ and a negative electrode of carbonaceous material or lithium metal is preferably used. As the electrolytic solution for the lithium secondary battery, a carbonate such as ethylene carbonate (EC) or propylene carbonate (PC) is preferably used.

Heretofore, there have been proposals to incorporate a variety of additives to a non-electrolytic solution so as to improve various performances of a lithium secondary battery.

U.S. Pat. No. 5,709,968 (corresponding to Japanese Patent Provisional Publication No. 9-50822) describes a number of compounds including p-fluoroanisole and 2,4-difluoroanisole to be used as additives for keeping a lithium secondary battery from over-charging.

Japanese Patent Provisional Publication No. 11-329490 describes pentafluorobenzene derivatives in which the six hydrogen atoms on the benzene ring are replaced with five fluorine atoms and one substituted ester group, substituted acyl group or trifluoromethyl group, such as methyl pentafluorobenzenecarboxylate and octafluorotoluene, which are employable for improving the cycle performance of a lithium secondary battery.

DISCLOSURE OF INVENTION

Further improvements of various lithium battery performances are desired. Particularly, the improvement of cycle performance (i.e., rate of retention of discharge capacity after repeated charging-discharging procedures) of a lithium secondary battery is highly desired.

In a lithium secondary battery using $LiCoO_2$, $LiMn_2O_4$ or $LiNiO_2$ as the positive electrode material, a portion of a solvent of the non-aqueous electrolytic solution oxidatively decomposes in the course of charging, and the decomposition product disturbs the desired electrochemical reaction of the battery. Accordingly, the battery performances lower. It is assumed that this phenomenon arises from electrochemical oxidation of the solvent in contact with the surface of the positive electrode.

On the other hand, in a lithium secondary battery using a highly crystalline carbonaceous material such as natural graphite or artificial graphite as the negative electrode material, the solvent in the non-aqueous electrolytic solution reductively decomposes on the surface of the negative electrode in the course of charging. The reductive decomposition occurs in a portion of the solvent in the repeated charging-discharging procedures even if the solvent contains EC (ethylene carbonate) which is generally employed as a solvent of the non-aqueous electrolytic solution, and hence the battery performances lower.

For these reasons, the lithium secondary batteries still are not satisfactory in their battery performances such as cycle performance and electric capacity.

The present invention has an object to provide a non-aqueous electrolytic solution which solves the above-mentioned problems concerning lithium secondary batteries and which is effective to impart an improved performance in the electric capacity, stability in the charged condition, and the cycle performance to a lithium secondary battery. The invention further has an object to provide a lithium secondary battery employing the non-aqueous electrolytic solution.

The present invention resides in a non-aqueous electrolytic solution comprising an electrolytic salt in a non-aqueous solvent, which further contains a pentafluorophenoxy compound having the formula (I):

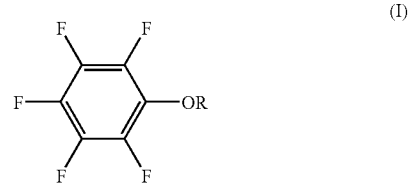

in which R represents a substituting group selected from the group consisting of an alkylcarbonyl group having 2-12 carbon atoms, an alkoxycarbonyl group having 2-12 carbon atoms, an aryloxycarbonyl group having 7-18 carbon atoms, and an alkanesulfonyl group having 1-12 carbon atoms, provided that at least one hydrogen atom contained in the substituting group can be replaced with a halogen atom or an aryl group having 6-18 carbon atoms.

The invention further resides in a lithium secondary battery which comprises a positive electrode, a negative electrode, and a non-aqueous electrolytic solution comprising an electrolytic salt in a non-aqueous solvent, in which the non-aqueous electrolytic solution further contains a pentafluorophenoxy compound of the above-mentioned formula (I).

In the invention, R of the formula (I) is a substituting group selected from the group consisting of an alkylcarbonyl group having 2-12 carbon atoms, an alkoxycarbonyl group having 2-12 carbon atoms, an aryloxycarbonyl group having 7-18 carbon atoms, and an alkanesulfonyl group having 1-12 carbon atoms. At least one hydrogen atom contained in the substituting group can be replaced with a halogen atom or an aryl group having 6-18 carbon atoms.

The substituting groups for R are described herein-below in detail.

Examples of the alkylcarbonyl groups having 2-12 carbon atoms include methylcarbonyl, ethylcarbonyl, propylcarbonyl, butylcarbonyl, pentylcarbonyl, hexylcarbonyl, heptylcarbonyl, octylcarbonyl, nonylcarbonyl, decylcarbonyl, and dodecylcarbonyl. Further, branched alkylcarbonyl groups such as isopropylcarbonyl, tert-butylcarbonyl and 2-ethylhexylcarbonyl can be mentioned. Furthermore, substituting groups in which at least one hydrogen atom contained in the substituting group is replaced with a halogen atom or an aryl group having 6-18 carbon atoms can be mentioned. Examples of the last substituting groups are alkylcarbonyl groups such as trifluoromethylcarbonyl, 1,2-dichloroethylcarbonyl, pentafluoroethylcarbonyl, heptafluoropropylcarbonyl, and benzylcarbonyl. Further, an alkylcarbonyl group in which an alkyl substituent having an unsaturated bonding such as methylene ($CH_2=$) or allyl ($CH_2=CH—CH_2—$) can be mentioned. Examples are vinylcarbonyl and 1-methylvinyl-carbonyl.

Examples of the pentafluorophenoxy compounds having an alkylcarbonyl group include pentafluorophenyl acetate, pentafluorophenyl propionate, pentafluorophenyl butyrate, pentafluorophenyl trifluoroacetate, pentafluorophenyl pentafluoropropionate, pentafluorophenyl acrylate, and pentafluorophenyl methacrylate.

Examples of the alkoxycarbonyl groups having 2-12 carbon atoms include methoxycarbonyl, ethoxycarbonyl, propoxycarbonyl, butoxycarbonyl, pentyloxycarbonyl, hexyloxycarbonyl, heptyloxycarbonyl, octyloxycarbonyl, nonyloxycarbonyl, decyloxycarbonyl, and dodecyloxycarbonyl. Further, branched alkoxycarbonyl groups such as isopropoxycarbonyl, tert-butoxycarbonyl, and 2-ethyl-hexyloxycarbonyl can be mentioned.

Furthermore, substituting groups in which at least one hydrogen atom contained in the substituting group is replaced with a halogen atom or an aryl group having 6-18 carbon atoms can be mentioned. Examples of the last substituting groups are alkoxycarbonyl groups such as 1-chloroethoxycarbonyl, 2-chloroethoxycarbonyl, 2,2,2-trofluoroethoxycarbonyl, 2,2,2-trichloroethoxycarbonyl, and benzyloxycarbonyl.

Examples of the pentafluorophenoxy compounds having an alkoxycarbonyl group include methyl pentafluorophenylcarbonate, ethyl pentafluorophenylcarbonate, tert-butyl pentafluorophenylcarbonate, 9-fluorenylmethyl pentafluorophenylcarbonate, and 2,2,2-trifluoroethyl pentafluorophenylcarbonate.

An example of the aryloxycarbonyl group having 7-18 carbon atoms is o-, m-, or p-tolyloxycarbonyl group.

Examples of the pentafluorophenoxy compounds having an arylokycarbonyl group include phenyl pentafluorophenylcarbonate and dipentafluorophenyl carbonate.

Examples of the alkanesulfonyl group having 1-12 carbon atoms include methanesulfonyl, ethanesulfonyl, propanesulfonyl, butanesulfonyl, pentanesulfonyl, hexanesulfonyl, heptanesulfonyl, octanesulfonyl, nonanesulfonyl, decanesulfonyl, and dodecanesulfonyl. Further, branched alkanesulfonyl groups such as 2-propanesufonyl can be mentioned.

Furthermore, substituting groups in which at least one hydrogen atom contained in the substituting group is replaced with a halogen atom. Examples of the last substituting groups are trifluoromethanesulfonyl and 2,2,2-trifluoroethanesulfonyl.

Examples of the pentafluorophenoxy compounds having an alkanesulfonyl group include pentafluorophenyl methanesulfonate, pentafluorophenyl ethanesulfonate, pentafluorophenyl propanesulfonate, pentafluorophenyl trifluoromethanesulfonate, and pentafluorophenyl 2,2,2-trifluoroethanesulfonate.

In the invention, one or more pentafluorphenoxy compounds are contained in the non-aqueous electrolytic solution. If the pentafluorophenoxy compound of the formula (I) is contained in the non-electrolytic solution in an excessive amount, the battery performances may lower. If the amount is too small, the expected improvement in the battery performance may not appear. Accordingly, the amount in the non-aqueous electrolytic solution generally is 0.01 to 20 wt. %, preferably 0.05 to 10 wt. %, more preferably 0.1 to 5 wt. %, from the viewpoint of increase of the cycle performance.

Examples of the non-aqueous solvents employed in the invention are cyclic carbonates such as ethylene carbonate (EC), propylene carbonate (PC), butylene carbonate (BC), and vinylene carbonate (VC), lactones such as γ-butyrolactone, linear carbonates such as dimethyl carbonate (DMC), methyl ethyl carbonate (MEC), and diethyl carbonate (DEC), ethers such as tetrahydrofuran, 2-methyltetrahydrofuran, 1,4-dioxane, 1,2-dimethoxyethane, 1,2-diethoxyethane, and 1,2-dibutoxyethane, nitriles such as acetonitrile, aliphatic esters such as methyl propionate, methyl pivalate, butyl pivalate, and octyl pivalate, and amides such as dimethylformamide.

The non-aqueous solvents can be employed singly or in combination. There are no specific limitations with respect to the combination of the non-aqueous solvents. Examples of the combinations include a combination of a cyclic carbonate and a linear carbonate, a combination of a cyclic carbonate and a lactone, a combination of three cyclic carbonates and a linear carbonate, a combination of a cyclic carbonate and a aliphatic ester, a combination of a cyclic carbonate, a lactone and an aliphatic ester, and a combination of a lactone and an aliphatic ester. If the non-aqueous solvent comprises a combination of a cyclic carbonate and other carbonate (e.g., linear carbonate), a ratio of the cyclic carbonate and other carbonate preferably is in the range of 5:95 to 45:55.

Examples of the electrolytic salts contained in the electrolytic solution of the invention include $LiPF_6$, $LiBF_4$, $LiClO_4$, $LiN(SO_2CF_3)_2$, $LiN(SO_2C_2F_5)_2$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$, and $LiPF_5(iso-C_3F_7)$. These electrolytes can be employed singly or in combination. The electrolyte can be incorporated into the non-aqueous solvent generally in such an amount as to give an electrolytic solution of 0.1 M to 3 M, preferably 0.5 M to 1.5 M.

The electrolytic solution can be prepared, for instance, by mixing the above-mentioned non-aqueous solvents; dissolving the above-mentioned electrolytic salt; in the mixture; and further dissolving at least one pentafluorophenoxy compound of the aforementioned formula (I) in the resulting mixture.

The non-aqueous electrolytic solution of the invention is employable for manufacturing a secondary battery, particularly a lithium secondary battery.

There are no specific limitations on other constituting materials to be used for manufacturing the secondary battery. Various conventionally employed constitutional materials can be used.

For instance, the active material of positive electrode is a compound metal oxide comprising cobalt, nickel or manganese, and lithium. The active material of positive electrode can be used singly or in combination. Examples of the compound metal oxides include $LiCoO_2$, $LiMn_2O_4$, $LiNiO_2$, and $LiCo_{1-x}Ni_xO_2$ ($0.01 < x < 1$). These compounds can be employed in an optional combination such as a combination of $LiCoO_2$ and $LiMn_2O_4$, a combination of $LiCoO_2$ and $LiNiO_2$, and a combination of $LiMn_2O_4$ and $LiNiO_2$.

The positive electrode can be manufactured by kneading the above-mentioned active material of positive electrode, an electro-conductive material such as acetylene black or carbon black, and a binder such as poly(tetrafluoroethylene) (PTFE), poly(vinylidene fluoride) (PVDF), styrene-butadiene copolymer (SBR), acrylonitrile-butadiene copolymer (NBR) or carboxymethylcellulose (CMC) to give a positive electrode composition; coating and pressing the positive electrode composition on a collector such as aluminum foil or a lath plate of stainless steel; and heating the pressed composition in vacuo at a temperature of approximately 50 to 250° C. for approximately 2 hours.

As the active material of negative electrode, lithium metal, lithium alloy, carbonaceous material capable of absorbing and releasing lithium (e.g., thermally decomposed carbonaceous material, coke, graphites such as artificial graphite and natural graphite, fired organic polymer, and carbon fiber), or a compound tin oxide is employable. It is preferred to employ carbonaceous materials having a graphite crystal structure in which the lattice distance of lattice surface (002), namely, $d_{002}$, is in the range of 0.335 to 0.340 nm (nanometer). The active materials of negative electrode can be employed singly or in combination. A powdery material such as the carbonaceous material is preferably used in combination with a binder such as ethylene propylene diene terpolymer (EPDM), polytetrafluoroethylene (PTFE), poly-(vinylidene fluoride) (PVDF), styrene-butadiene copolymer (SBR), acrylonitrile-butadiene copolymer (NBR), or carboxymethylcellulose (CMC). There are no limitations with respect to the preparing method of the negative electrode. The negative electrode can be prepared by a method similar to that for the preparation of the positive electrode.

There are no specific limitations with respect to the structure of the non-aqueous lithium secondary battery of the invention. For instance, the non-aqueous secondary battery can be a battery of coin type comprising a positive electrode, a negative electrode, and single or plural separators, or a cylindrical or prismatic battery comprising a positive electrode, a negative electrode, and a separator roll.

The separator can be a known material such as microporous polyolefin film, woven cloth, or non-woven cloth.

The present invention is further described by the following examples and comparison examples.

EXAMPLE 1

1) Preparation of Non-aqueous Electrolytic Solution

In a non-aqueous solvent of PC:DMC (=1:2, volume ratio) was dissolved $LiPF_6$ (electrolytic salt) to give a non-aqueous electrolytic solution of 1M concentration. To the non-aqueous electrolytic solution was further added 0.5 wt. % of pentafluorophenyl methanesulfonate.

2) Manufacture Lithium Secondary Battery and Measurement of its Battery Characteristics $LiCoO_2$ (positive electrode active material, 90 wt. %), acetylene black (electro-conductive material, 5 wt. %), and poly(vinylidene fluoride) (binder, 5 wt. %) were mixed. To the resulting mixture was further added 1-methyl-2-pyrrolidone. Thus produced mixture was coated on aluminum foil, dried, pressed, and heated to give a positive electrode.

Artificial graphite (negative electrode active material, 90 wt. %) and poly(vinylidene fluoride) (binder, 10 wt. %) were mixed. To the resulting mixture was further added 1-methyl-2-pyrrolidone. Thus produced mixture was coated on copper foil, dried, pressed, and heated to give a negative electrode.

The positive and negative electrodes, a microporous polypropylene film separator, and the above-mentioned non-aqueous electrolytic solution were employed to give a coin-type battery (diameter: 20 mm, thickness: 3.2 mm).

The coin-type battery was charged at room temperature (20° C.) with a constant electric current (1.1 mA) to reach 4.2 V for 5 hours. Subsequently, the battery was discharged to give a constant electric current (1.1 mA) to give a terminal voltage of 2.7 V. The charging-discharging cycle test was repeated.

The initial discharge capacity was almost the same as the capacity measured in a battery using an 1M $LiPF_6$ and EC/DEC (3/7, volume ratio) solvent mixture (containing no additive) [see Comparison Example 2].

After the 50 cycle charging-discharging procedure, the retention of discharge capacity was 88.8% of the initial discharge capacity (100% ).

The manufacturing conditions and the battery performances are shown in Table 1.

EXAMPLE 2

The procedures of Example 1 for preparing a non-aqueous electrolytic solution were repeated except for employing 1 wt. % of pentafluorophenyl methanesulfonate. Then, a coin-type battery was manufactured by employing the resulting non-aqueous electrolytic solution.

The 50 cycle charging-discharging test was carried out, and it was observed that the retention of discharge capacity was 91.9%.

The manufacturing conditions and the battery performances are shown in Table 1.

EXAMPLE 3

The procedures of Example 1 for preparing a non-aqueous electrolytic solution were repeated except for employing 2 wt. % of pentafluorophenyl methanesulfonate. Then, a coin-type battery was manufactured by employing the resulting non-aqueous electrolytic solution.

The 50 cycle charging-discharging test was carried out, and it was observed that the retention of discharge capacity was 90.3%.

The manufacturing conditions and the battery performances are shown in Table 1.

EXAMPLE 4

The procedures of Example 1 for preparing a non-aqueous electrolytic solution were repeated except for employing 1 wt. % of pentafluorophenyl acetate. Then, a coin-type battery was manufactured by employing the resulting non-aqueous electrolytic solution.

The 50 cycle charging-discharging test was carried out, and it was observed that the retention of discharge capacity was 90.6%.

The manufacturing conditions and the battery performances are shown in Table 1.

EXAMPLE 5

The procedures of Example 1 for preparing a non-aqueous electrolytic solution were repeated except for employing 1 wt. % of methyl pentafluorophenylcarbonate. Then, a coin-type battery was manufactured by employing the resulting non-aqueous electrolytic solution.

The 50 cycle charging-discharging test was carried out, and it was observed that the retention of discharge capacity was 89.7%.

The manufacturing conditions and the battery performances are shown in Table 1.

EXAMPLE 6

The procedures of Example 1 for preparing a non-aqueous electrolytic solution were repeated except for employing a non-aqueous solvent of EC/MEC (3/7, volume ratio) and 1 wt. % of pentafluorophenyl methanesulfonate. Then, a coin-type battery was manufactured by employing the resulting non-aqueous electrolytic solution.

The 50 cycle charging-discharging test was carried out, and it was observed that the retention of discharge capacity was 92.2%.

The manufacturing conditions and the battery performances are shown in Table 1.

EXAMPLE 7

The procedures of Example 1 for preparing a non-aqueous electrolytic solution were repeated except for employing a non-aqueous solvent of EC/MEC (3/7, volume ratio) and 1 wt. % of pentafluorophenyl acetate. Then, a coin-type battery was manufactured by employing the resulting non-aqueous electrolytic solution.

The 50 cycle charging-discharging test was carried out, and it was observed that the retention of discharge capacity was 91.7%.

The manufacturing conditions and the battery performances are shown in Table 1.

EXAMPLE 8

The procedures of Example 1 for preparing a non-aqueous electrolytic solution were repeated except for employing a non-aqueous solvent of EC/MEC (3/7, volume ratio) and 1 wt. % of methyl pentafluorophenylcarbonate. Then, a coin-type battery was manufactured by employing the resulting non-aqueous electrolytic solution.

The 50 cycle charging-discharging test was carried out, and it was observed that the retention of discharge capacity was 91.4%.

The manufacturing conditions and the battery performances are shown in Table 1.

EXAMPLE 9

The procedures of Example 1 for preparing a non-aqueous electrolytic solution were repeated except for employing a non-aqueous solvent of EC/DEC (1/2, volume ratio) and 1 wt. % of pentafluorophenyl methanesulfonate. Then, a coin-type battery was manufactured by employing the resulting non-aqueous electrolytic solution.

The 50 cycle charging-discharging test was carried out, and it was observed that the retention of discharge capacity was 92.3%.

The manufacturing conditions and the battery performances are shown in Table 1.

EXAMPLE 10

The procedures of Example 1 for preparing a non-aqueous electrolytic solution were repeated except for employing $LiMn_2O_4$ in place of $LiCoO_2$ and 1 wt. % of pentafluorophenyl methanesulfonate. Then, a coin-type battery was manufactured by employing the resulting non-aqueous electrolytic solution.

The 50 cycle charging-discharging test was carried out, and it was observed that the retention of discharge capacity was 88.1%.

The manufacturing conditions and the battery performances are shown in Table 1.

EXAMPLE 11

The procedures of Example 1 for preparing a non-aqueous electrolytic solution were repeated except for employing natural graphite in place of artificial graphite and 1 wt. % of pentafluorophenyl methanesulfonate. Then, a coin-type battery was manufactured by employing the resulting non-aqueous electrolytic solution.

The 50 cycle charging-discharging test was carried out, and it was observed that the retention of discharge capacity was 90.5%.

The manufacturing conditions and the battery performances are shown in Table 1.

COMPARISON EXAMPLE 1

In a non-aqueous solvent of PC:DMC (=1:2, volume ratio) was dissolved $LiPF_6$ to give a non-aqueous electrolytic solution of 1M concentration. To the non-aqueous electrolytic solution was added no pentafluorophenoxy compound.

Then, a coin-type battery, was manufactured by employing the resulting non-aqueous electrolytic solution.

In the battery performance test, no charging-discharging was observed.

COMPARISON EXAMPLE 2

In a non-aqueous solvent of EC:DEC (=3:7, volume ratio) was dissolved $LiPF_6$ to give a non-aqueous electrolytic solution of 1M concentration. To the non-aqueous electrolytic solution was added no pentafluorophenoxy compound. Then, a coin-type battery was manufactured by employing the resulting non-aqueous electrolytic solution.

The 50 cycle charging-discharging test was carried out, and it was observed that the retention of discharge capacity was 82.1%.

The manufacturing conditions and the battery performances are shown in Table 1.

TABLE 1

| Example | Electrode Posi. Nega. | Additive (amount: wt. %) | Electrolytic solution | Initial capacity (r.v.) | 50% cycle retention (%) |
|---|---|---|---|---|---|
| 1 | $LiCoO_2$ Art. | Pentafluorophenyl methanesulfonate (0.5) | 1M $LiPF_6$ PC/DMC = 1/2 | 1.00 | 88.8 |
| 2 | $LiCoO_2$ Art. | Pentafluorophenyl methanesulfonate (1) | 1M $LiPF_6$ PC/DMC = 1/2 | 1.01 | 91.9 |
| 3 | $LiCoO_2$ Art. | Pentafluorophenyl methanesulfonate (2) | 1M $LiPF_6$ PC/DMC = 1/2 | 1.02 | 90.3 |
| 4 | $LiCoO_2$ Art. | Pentafluorophenyl acetate (1) | 1M $LiPF_6$ PC/DMC = 1/2 | 1.01 | 90.6 |
| 5 | $LiCoO_2$ Art. | Methyl Pentafluorophenylcarbonate (1) | 1M $LiPF_6$ PC/DMC = 1/2 | 1.00 | 89.7 |
| 6 | $LiCoO_2$ Art. | Pentafluorophenyl methanesulfonate (1) | 1M $LiPF_6$ EC/MEC = 3/7 | 1.02 | 92.2 |
| 7 | $LiCoO_2$ Art. | Pentafluorophenyl acetate (1) | 1M $LiPF_6$ EC/MEC = 3/7 | 1.02 | 91.7 |
| 8 | $LiCoO_2$ Art. | Mechyl Pentafluorophenylcarbonate (1) | 1M $LiPF_6$ EC/MEC = 3/7 | 1.02 | 91.4 |
| 9 | $LiCoO_2$ Art. | Pentafluorophenyl methanesulfonate (1) | 1M $LiPF_6$ EC/DEC = 1/2 | 1.01 | 92.3 |
| 10 | $LiMn_2O_4$ Art. | Pentafluorophenyl methanesulfonate (1) | 1M $LiPF_6$ PC/DMC = 1/2 | 0.85 | 88.1 |
| 11 | $LiCoO_2$ Nat. | Pentafluorophenyl methanesulfonate (1) | 1M $LiPF_6$ PC/DMC = 1/2 | 0.99 | 90.5 |
| Con. 1 | $LiCoO_2$ Art. | None | 1M $LiPF_6$ PC/DMC = 1/2 | — | Failure |

TABLE 1-continued

| Example | Electrode Posi. Nega. | Additive (amount: wt. %) | Electrolytic solution | Initial capacity (r.v.) | 50% cycle retention (%) |
|---|---|---|---|---|---|
| Con. 2 | LiCoO$_2$ Art. | None | 1M LiPF$_6$ EC/DEC = 3/7 | 1 | 82.1 |

Remarks:
PC: Propylene carbonate
DMC: Dimethyl carbonate
EC: Ethylene carbonate
MEC: Methyl ethyl carbonate

INDUSTRIAL UTILITY

The present invention provides a lithium secondary battery having excellent battery performances in the cycle performance, electric capacity, and storage performance.

What is claimed is:

1. A non-aqueous electrolytic solution comprising an electrolytic salt in a non-aqueous solvent, which further contains a pentafluorophenoxy compound having the formula (I):

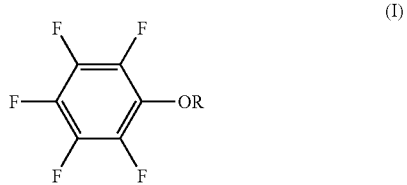

in which R represents a substituting group selected from the group consisting of an alkylcarbonyl group having 2-12 carbon atoms, an alkoxycarbonyl group having 2-12 carbon atoms, an aryloxycarbonyl group having 7-18 carbon atoms, and an alkanesulfonyl group having 1-12 carbon atoms, provided that at least one hydrogen atom contained in the substituting group can be replaced with a halogen atom or an aryl group having 6-18 carbon atoms.

2. The non-aqueous electrolytic solution defined in claim 1, in which the pentafluorophenoxy compound is contained in the electrolytic solution in an amount of 0.01 to 20 wt. %.

3. The non-aqueous electrolytic solution defined in claim 1, in which the pentafluorophenoxy compound is contained in the electrolytic solution in an amount of 0.05 to 10 wt. %.

4. The non-aqueous electrolytic solution defined in claim 1, in which the pentafluorophenoxy compound is contained in the electrolytic solution in an amount of 0.1 to 5 wt. %.

5. The non-aqueous electrolytic solution defined in claim 1, in which the pentafluorophenoxy compound is at least one compound selected from the group consisting of pentafluorophenyl acetate, pentafluorophenyl propionate, pentafluorophenyl butyrate, pentafluorophenyl trifluoroacetate, pentafluorophenyl pentafluoropropionate, pentafluorophenyl acrylate, and pentafluorophenyl methacrylate.

6. The non-aqueous electrolytic solution defined in claim 1, in which the pentafluorophenoxy compound is at least one compound selected from the group consisting of methyl pentafluorophenylcarbonate, ethyl pentafluorophenylcarbonate, tert-butyl pentafluorophenylcarbonate, 9-fluorenylmethyl pentafluorophenylcarbonate, and 2,2,2-trifluoroethyl pentafluorophenylcarbonate.

7. The non-aqueous electrolytic solution defined in claim 1, in which the pentafluorophenoxy compound is at least one compound selected from the group consisting of phenyl pentafluorophenylcarbonate and dipentafluorophenyl carbonate.

8. The non-aqueous electrolytic solution defined in claim 1, in which the pentafluorophenoxy compound is at least one compound selected from the group consisting of pentafluorophenyl methanesulfonate, pentafluorophenyl ethanesulfonate, pentafluorophenyl propanesulfonate, pentafluorophenyl trifluoromethanesulfoanate, and pentafluorophenyl 2,2,2-trifluoroethanesulfonate.

9. The non-aqueous electrolytic solution defined in claim 1, in which the pentafluorophenoxy compound is at least one compound selected from the group consisting of pentafluorophenyl methanesulfonate, pentafluorophenyl acetate, and methyl pentafluorophenylcarbonate.

10. The non-aqueous electrolytic solution defined in claim 1, in which the non-aqueous solvent is a mixture of a cyclic carbonate and a linear carbonate.

11. The non-aqueous electrolytic solution defined in claim 10, in which a volume ratio between the cyclic carbonate and the linear carbonate is in the range of 5:95 to 45:55.

12. The non-aqueous electrolytic solution defined in claim 1, in which the electrolytic salt is at least one salt selected from the group consisting of LiPF$_6$, LiBF$_4$, LiClO$_4$, LiN(SO$_2$CF$_3$)$_2$, LiN(SO$_2$C$_2$F$_5$)$_2$, LiC(SO$_2$CF$_3$)$_3$, LiPF$_4$(CF$_3$)$_2$, LiPF$_3$(C$_2$F$_5$)$_3$, LiPF$_3$(CF$_3$)$_3$, LiPF$_3$(iso-C$_3$F$_7$)$_3$, and LiPF$_5$(iso-C$_3$F$_7$).

13. A lithium secondary battery which comprises a positive electrode, a negative electrode, and a non-aqueous electrolytic solution comprising an electrolytic salt in a non-aqueous solvent, in which the non-aqueous electrolytic solution further contains a pentafluorophenoxy compound having the formula (I):

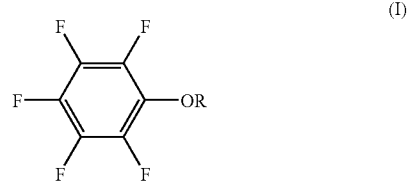

in which R represents a substituting group selected from the group consisting of an alkylcarbonyl group having 2-12 carbon atoms, an alkoxycarbonyl group having 2-12 carbon atoms, an aryloxycarbonyl group having 7-18 carbon atoms, and an alkanesulfonyl group having 1-12 carbon atoms, provided that at least one hydrogen atom contained in the substituting group can be replaced with a halogen atom or an aryl group having 6-18 carbon atoms.

14. The lithium secondary battery of claim 13, in which the pentafluorophenoxy compound is contained in the electrolytic solution in an amount of 0.01 to 20 wt. %.

15. The lithium secondary battery of claim 13, in which the pentafluorophenoxy compound is contained in the electrolytic solution in an amount of 0.1 to 5 wt. %.

16. The lithium secondary battery of claim 13, in which the positive electrode comprises at least one active material selected from the group consisting of LiCoO$_2$, LiMn$_2$O$_4$, LiNiO$_2$, and LiCo$_{1-x}$Ni$_x$O$_2$ under the condition of 0.01<x<1.

17. The lithium secondary battery of claim 13, in which the negative electrode comprises artificial graphite or natural graphite as active material.

* * * * *